United States Patent
Robertson et al.

(10) Patent No.: US 8,433,132 B2
(45) Date of Patent: Apr. 30, 2013

(54) METHOD FOR EFFICIENT REPRESENTATION AND PROCESSING OF COLOR PIXEL DATA IN DIGITAL PATHOLOGY IMAGES

(75) Inventors: Mark Robertson, Cupertino, CA (US); Ming-Chang Liu, San Jose, CA (US); Ximin Zhang, San Jose, CA (US)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 13/085,280

(22) Filed: Apr. 12, 2011

(65) Prior Publication Data

US 2012/0263356 A1     Oct. 18, 2012

(51) Int. Cl.
*G06K 9/34* (2006.01)

(52) U.S. Cl.
USPC .......................................... 382/162

(58) Field of Classification Search .................. 382/128, 382/130, 132–133, 162, 164–166, 232, 239, 382/274–275; 358/1.9, 2.1; 348/77, 79; 378/5, 86, 98.9, 98.11, 98.12
See application file for complete search history.

(56) References Cited

U.S. PATENT DOCUMENTS

| | | | |
|---|---|---|---|
| 5,075,767 A | 12/1991 | Takaragi | |
| 6,944,333 B2 * | 9/2005 | Douglass | 382/166 |
| 8,068,133 B2 * | 11/2011 | Arai et al. | 348/79 |
| 8,077,959 B2 * | 12/2011 | Dekel et al. | 382/133 |
| 8,116,551 B2 * | 2/2012 | Gallagher et al. | 382/133 |
| 8,139,273 B2 * | 3/2012 | Nishikawa | 358/474 |
| 8,160,331 B2 * | 4/2012 | Otsuka | 382/128 |
| 8,280,134 B2 * | 10/2012 | Hoyt | 382/128 |
| 8,295,562 B2 * | 10/2012 | De La Torre-Bueno | 382/128 |
| 2003/0059121 A1 | 3/2003 | Savakis et al. | |
| 2004/0179731 A1 | 9/2004 | Ono et al. | |
| 2005/0052705 A1 | 3/2005 | Hersch et al. | |
| 2006/0056711 A1 | 3/2006 | Lee et al. | |
| 2006/0204086 A1 | 9/2006 | Gargi | |
| 2010/0067774 A1 | 3/2010 | Marcelpoil et al. | |
| 2011/0075897 A1 | 3/2011 | Dekel et al. | |

* cited by examiner

Primary Examiner — Jose Couso

(74) Attorney, Agent, or Firm — Haverstock & Owens LLP (57) ABSTRACT

Efficient representation of color digital pathology images (DPI) is described herein, which is accomplished by exploiting properties unique to such images. The method decomposes the data into constituent parts whose relative importance is able to be specified, allowing the data to be accurately represented with less bit precision, less spatial resolution or less spectral resolution. Two specific areas where the method is able to be utilized include: (1) more-efficient image compression; and (2) more efficient processing of the data. Efficient image compression is accomplished by assigning fewer bits to less-important colors. Efficient data processing is accomplished by processing only those colors, or combinations of colors, that are deemed important.

27 Claims, 9 Drawing Sheets

METHOD FOR EFFICIENT REPRESENTATION AND PROCESSING OF COLOR PIXEL DATA IN DIGITAL PATHOLOGY IMAGES

FIELD OF THE INVENTION

The present invention relates to the field of image processing. More specifically, the present invention relates to an efficient method of representing and processing color pixel data in digital pathology images.

BACKGROUND OF THE INVENTION

A color digital image is typically displayed in the form of three arrays of binary numbers. Each array (or "image plane") represents an axis of a suitable color coordinate system in accordance with the well known trichromatic theory. The color of a pixel in the digital image is defined by an associated binary number (defining one of three color components from the color coordinate system) from each array.

The amount of data used to represent a digital image is able to be extremely large. For example, a color digital image with 1024×1024 pixels would require 3 megabytes of storage if the pixels are represented in the computer by three image planes of 8-bit numbers. The large amount of data required to represent a digital image in a computer is able to result in significant costs that are associated both with increased storage capacity requirements, and the computing resources and time required to transmit the data to another computing device.

In efforts to reduce these costs, digital image compression techniques have been developed. These digital image compression techniques are generally able to be used to reduce the amount of data required to represent a digital image in a computer. These techniques are also able to reduce the computing costs associated with storing and transmitting digital images. There are, however, significant costs, such as diminished quality, that are able to be incurred in using these compression techniques.

SUMMARY OF THE INVENTION

Efficient representation of color digital pathology images (DPI) is described herein, which is accomplished by exploiting properties unique to such images. The method decomposes the data into constituent parts whose relative importance is able to be specified, allowing the data to be accurately represented with less bit precision, less spatial resolution or less spectral resolution. Two specific areas where the method is able to be utilized include: (1) more-efficient image compression; and (2) more efficient processing of the data. Efficient image compression is accomplished by assigning fewer bits to less-important colors. Efficient data processing is accomplished by processing only those colors, or combinations of colors, that are deemed important.

In one aspect, a method of representing a digital pathology image programmed in a controller in a device comprises implementing stain separation to separate a stain including at least one color component and resampling the at least one color component based on importance. The method further comprises applying a linear transform to the at least one resampled color component. The method further comprises image coding and combining the coded image and stain vector information to generate a compressed image. Image coding comprises compression based on quantization of discrete cosine transform or discrete wavelet transform coefficients. Stain separation separates the stain including at least two color components. Resampling comprises reducing a number of bits used to represent a sample value. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system and a scanner.

In another aspect, a method of encoding a digital pathology image programmed in a controller in a device comprises implementing stain separation to separate a stain including at least two color components, resampling the at least two color components based on importance, applying a linear transform to the at least two resampled color components resulting in transformed data, encoding the transformed data into encoded data and combining the encoded data and stain vector information to generate a compressed image. Image coding comprises compression based on quantization of discrete cosine transform or discrete wavelet transform coefficients. Resampling comprises reducing a number of bits used to represent a sample value. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system and a scanner.

In another aspect, a method of decreasing computational complexity of processing a digital pathology image by using stain separation programmed in a controller in a device comprises implementing stain separation to separate a stain into color components, implementing importance weighting for determining a weighting for each of the color components to produce a single color component, processing the single color component and aggregating an output using the processed single color component and additional information. Processing comprises implementing extended depth of field. The additional information comprises original RGB information. The additional information comprises the color components.

In another aspect, an apparatus for encoding a digital pathology image programmed in a controller in a device comprises a stain separation module for separating stain components, a resampling module for resampling the stain components based on importance, a transform module for applying a linear transform to the resampled stain components resulting in transformed data, an encoding module for encoding the transformed data and a combining module for combining the encoded image and stain vector information to generate a compressed image. Image coding comprises compression based on quantization of discrete cosine transform or discrete wavelet transform coefficients. Resampling comprises reducing a number of bits used to represent a sample value. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system and a scanner.

In yet another aspect, an apparatus comprises a memory for storing an application, the application for implementing stain separation to separate a stain including at least one color component and resampling the at least one color component based on importance and a processing component coupled to the memory, the processing component configured for processing the application. The application is further for applying a linear transform to the at least one resampled color component. The application is further for image coding and combining the coded image and stain vector information to generate a compressed image. Image coding comprises compression based on quantization of discrete cosine transform or discrete wavelet transform coefficients. Stain separation separates the stain including at least two color components. Resampling comprises reducing a number of bits used to represent a sample value. In some embodiments, the apparatus comprises a camera.

In another aspect, a method of generating a digital pathology image programmed in a controller in a device comprises decoding an image resulting in transformed color components, applying an inverse linear transform to the transformed color components resulting in resampled color components, resampling the resampled color components resulting in stain color components and combining the stain color components and additional information to generate the digital pathology image. The additional information comprises stain vector information. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system and a scanner.

DETAILED DESCRIPTION OF THE PREFERRED EMBODIMENT

There are multiple color spaces that are able to be used to acquire visual data. Without loss of generality, a standard RGB (red, green, blue) representation that is common to cameras and scanners is assumed herein. The technique described herein is equally applicable to other color representations, such as multi-spectral or hyper-spectral (which use more than three spectral bands).

It is common in the consumer electronics industry to transform pixel data from RGB space to an alternate space prior to compression or processing. One such alternate space is a luma-chroma representation known as YCbCr, which is a linear transformation as follows:

$$Y = 0.299R + 0.587G + 0.114B$$

$$Cb = -0.1687R - 0.3313G + 0.5B + 128$$

$$Cr = 0.5R - 0.4187G - 0.0813B + 128. \quad (1)$$

Variations on the above definition exist but do not change the substance of this technique.

The Y color element represents the luma, whose coefficients above were originally chosen to approximate the human visual system's (HVS's) perception of gray-scale intensity. The Cb and Cr color elements are known as chroma, or color differences.

A simplified luma-chroma approximation is the reversible color transform defined in the JPEG2000 standard, also adopted by Digital Imaging and Communications in Medicine (DICOM):

$$Y_r = \text{Floor}((R + 2G + B)/4)$$

$$Cb_r = B - G \quad (2)$$

$$Cr_r = R - G.$$

The "Floor" function rounds down to the nearest integer value of its argument, and the subscript "r" indicates that the Y, Cb, and Cr values are different "reversible" quantities compared to the traditional definition given in Equation (1).

There are other common color spaces that are useful in specific application domains, such as Cyan, Magenta, Yellow, Black (CMYK), Hue, Saturation, Value (HSV), Hue, Saturation, Lightness (HSL) and many others. Most of these other color spaces are not useful from a data compression point of view.

Figure 1:
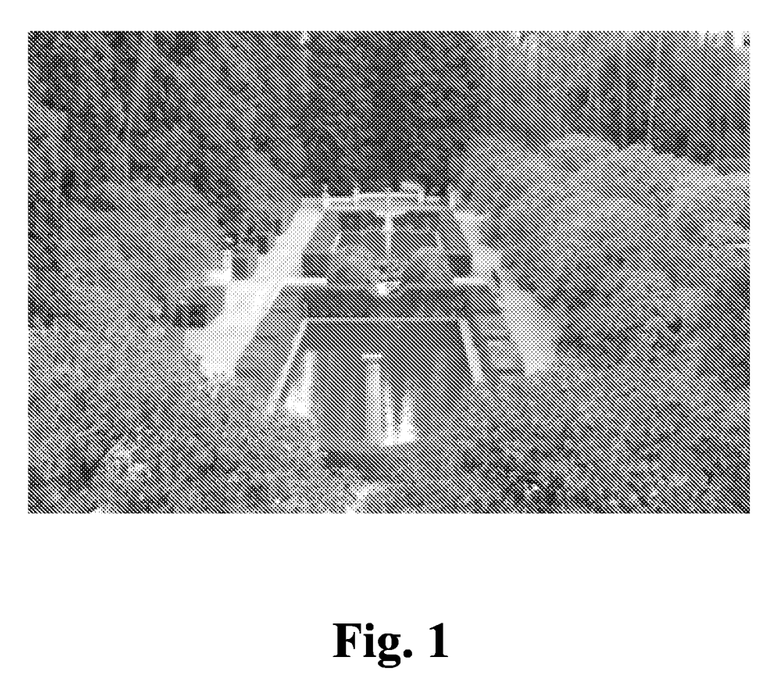
FIG. 1 shows an example of a natural image.

The YCbCr color space is used by major image and video compression standards bodies such as JPEG and MPEG, shown above in Equation (1). Conversion from RGB to YCbCr does not by itself reduce the number of bits required to represent a pixel, because each color component (R,G,B or Y,Cb,Cr) is usually represented with 8 bits. For natural images, such as FIG. 1, properties of the HVS allow the Cb and Cr color channels to be spatially sub-sampled with minimal loss in perceived quality.

Figure 2:
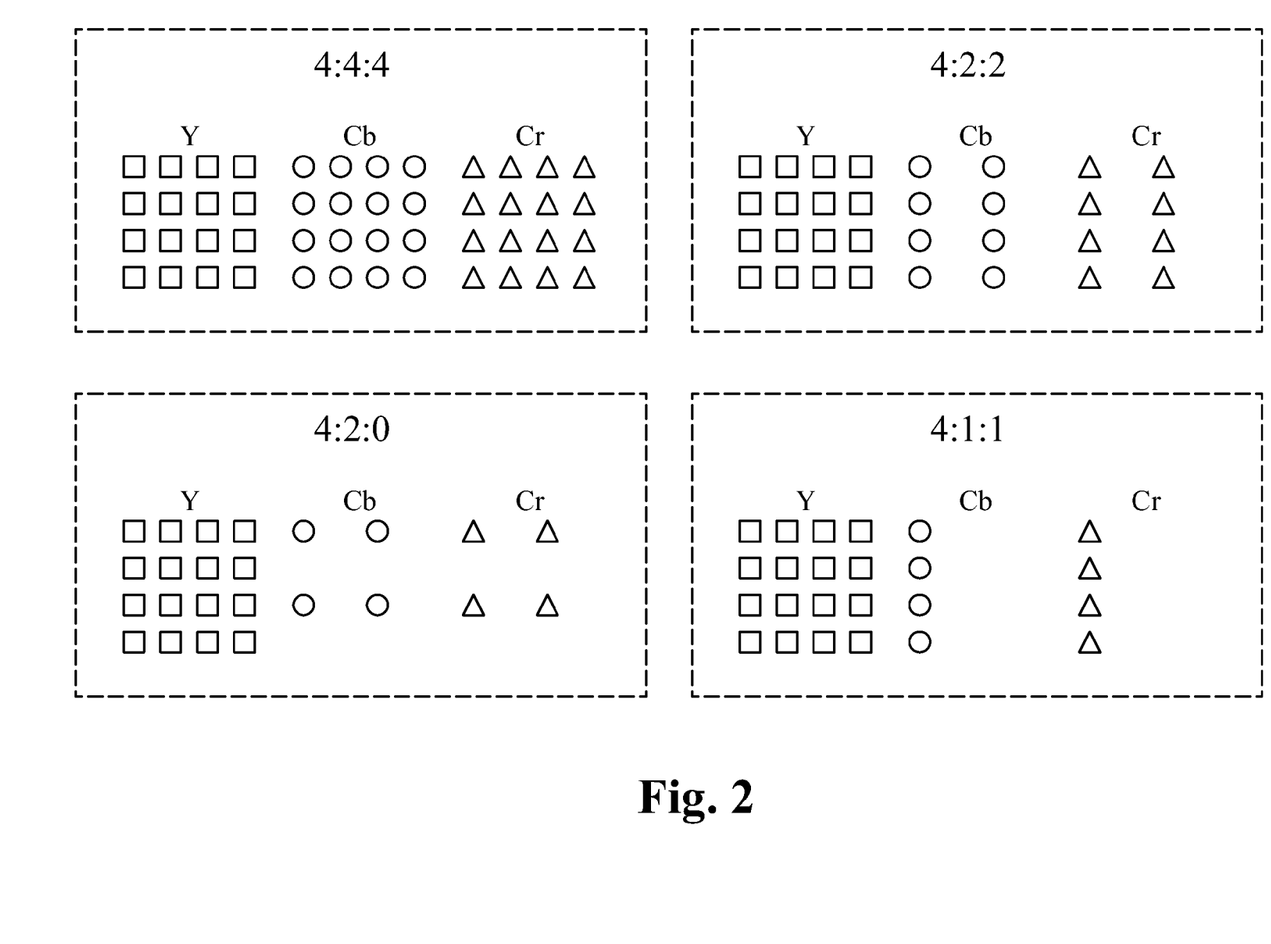
FIG. 2 illustrates several common color sub-sampling possibilities, including their common names.

FIG. 2 shows several common color sub-sampling possibilities, including their common names. Such sub-sampling is very efficient for natural image content, and reduces the size of data representation prior to explicit compression techniques (such as spatial-transform coding, like block-based DCT or wavelet-based methods) or other processing. These figures use terminology from video coding; minor differences exist when compared to still-image coding.

In FIG. 2, the 4:4:4 color format indicates that all three color components are at equivalent resolutions, while the 4:2:2 color format, for example, has the Cb and Cr components at half the horizontal resolution and full vertical resolution relative to the Y component. Color sub-sampling as shown above is possible with minimal loss in subjective visual quality due to properties of natural images and the HVS.

Sub-sampled color representations such as those in FIG. 2 clearly reduce the size of the data, and are based on the assumption that the Y component is the most important component to a human viewer. Such representations also are able to reduce computational complexity in algorithms that process visual data. One obvious reduction is due to the reduced quantity of data to be processed; for example, the 4:2:0 representation has only half the data of the full-resolution representation. Another common reduction is accomplished by performing some processing only with the Y color component, which is justified due to the assumption of the Y component's prime importance. Throughout the image and video processing community, it is very common to process only the luma plane and ignore the chroma planes. One example (among many) is video motion estimation, where motion correspondences between video frames are determined by considering just the Y color component. In such cases, the quantity of data processed is only one-third the quantity of the original data.

Inadequacy of Standard Methods

Although a sub-sampled YCbCr color space works very well for natural scenes, it is inappropriate for images typically encountered in digital pathology. Because of artificial stains introduced to enhance contrast and distinguish biological characteristics, the distribution and importance of colors for digital pathology images (DPI) are very different than for natural images. For example, the 4:2:0 YCbCr sub-sampling scheme assumes that the blue and red channels are less important than the green channel; however, for the DPI image in FIG. 3, red and blue are in fact the most important colors (where the background is generally white, the jagged lines are red and the generally circular globs are blue), and it would be harmful to lower their quality artificially.

Standard sub-sampling of the YCbCr color space is inadequate here because of the special nature of DPI images. The standard color sub-sampling techniques assume "natural" scene content. However, pathology images contain artificial colors that depend on the particular staining agent used, which in turn depends on the objectives of the pathologist's analysis. In the example shown in FIG. 3, a popular staining method known as IHC (Immunohistochemistry) was used, which is widely used in the diagnosis of abnormal cells such as those found in cancerous tumors. IHC is also widely used in basic research to understand the distribution and localization of biomarkers and differentially expressed proteins in different parts of a biological tissue.

Many different staining methods exist, and there is no single sub-sampled color space that is able to efficiently represent the variety of corresponding colors. How to analyze the stain color present in a DPI image is discussed next, and the subsequent section uses these results for efficient data representation and processing.

Stain Separation

In the biomedical area, stains (dyes) are frequently used to visually enhance specified biological substances such as nuclei, cytoplasm, membranes, other structures and specific proteins. Multiple stained slides are usually used to find the co-occurrence and co-localization of different bio-markers. Currently, the majority of stains absorb the light based on the amount deposited in a certain location.

In optics, the Lambert-Beer law relates the absorption of light to the properties of the material through which the light is traveling. The law states that there is a logarithmic dependence between the transmission of light through a substance, and the product of the absorption coefficient of the substance and the distance the light travels through the material. I denotes the intensity of light that has passed through a sample (transmitted light intensity), $I_0$ denotes the intensity of the light before it enters the sample (incident light intensity), and AD denotes the product of the absorption coefficient of the substance and the distance the light travels. The Lambert—Beer law is able to then be described as the following equation for each color channel, $$I = I_0 10^{-AD} \quad (3)$$

Since the distance the light travels through the material is virtually a constant for a slide, the product value AD actually represents the deposit (amount) of the stain. Therefore, the transmission of light in each channel relates to the amount of stain in a non-linear way. As a result, the image intensity values are not able to be used directly for separation. However, if the product value AD is represented as the following Equation (4), the AD of each channel is linearly related to the amount of stain. With this linear relationship, separation of contributions from multiple stains are able to be achieved.

$$AD = -\log_{10}(I/I_{10}) \quad (4)$$

In optics, AD is called optical density (OD). In the following parts, OD is used instead of AD for the convenience of description.

After slide preparation, an RGB image is obtained, and each pixel is described with a vector of three elements (red, green, and blue) in RGB domain. With the above OD transform, this vector is converted into a 3×1 OD vector. Although the amount of the stain is able to be different for different pixel locations, for each pure stain the relative values of each channel are fixed. For example, if Equation (5) is used to normalize the OD vector to unit length, the OD vector [0.650, 0.704, 0.286] is observed for hematoxylin stain. $OD_R$ denotes the OD value in the R channel, $OD_G$ denotes the OD value in the G channel, and $OD_B$ denotes the OD value in B channel.

$$V_C = \left[ \frac{OD_R}{\sqrt{OD_R^2 + OD_G^2 + OD_B^2}}, \frac{OD_G}{\sqrt{OD_R^2 + OD_G^2 + OD_B^2}}, \frac{OD_B}{\sqrt{OD_R^2 + OD_G^2 + OD_B^2}} \right]. \quad (5)$$

This means each stain is able to be represented by a single 1×3 color vector in the OD domain. With the above observation, for an image with a single stain, each pixel in OD domain is able to be described as $$P_{i,j} = c_{i,j} V_c, \quad (6)$$

where $c_{i,j}$ is the amount of the stain in position [i,j], and $V_c$ is the stain color vector. Since $V_c$ is unchanged for the image with a single stain, the only variable for each pixel is the amount of the stain $c_{i,j}$. This is significant for image compression because the three-channel color image is transformed to a single channel scalar-valued image C plus a 1×3 color vector $V_c$.

When multiple stains are applied to one slide, two or more stains are able to be superimposed. In order to obtain the quantification data of each stain, stain separation has to be applied to separate the relative contribution of each stain.

As described above, each pixel is a linear combination of multiple stains in the OD domain. An elegant stain separation is able to be achieved in OD domain. In an example, an image is assumed to have three stains. Let c0 denote the amount of stain0, c1 the amount of stain1, and c2 the amount of stain2; and let $V_{c0}$, $V_{c1}$, and $V_{c2}$ denote the stain vectors of stains 0, 1, and 2, respectively. Then, the following exists for each pixel ($OD_R$ denotes the OD value in the R channel, $OD_G$ denotes the OD value in the G channel and $OD_B$ denotes the OD value in the B channel), $$[c0 \ c1 \ c2] \begin{bmatrix} V_{C0} \\ V_{C1} \\ V_{C2} \end{bmatrix} = [OD_R \ OD_G \ OD_B] \quad (7)$$

Then, $$[c0 \ c1 \ c2] = [OD_R \ OD_G \ OD_B] \begin{bmatrix} V_{C0} \\ V_{C1} \\ V_{C2} \end{bmatrix}^{-1} \quad (8)$$

By applying the above equation on all the pixels, the stain separation is completed and three single stain images $C_0$, $C_1$, and $C_2$ are obtained. If only two stains are used, then $C_2$ is able to be the residue after the stain separation. It usually contains no meaningful information, and the stain separation is able to be optimized by minimizing it.

Figure 3:
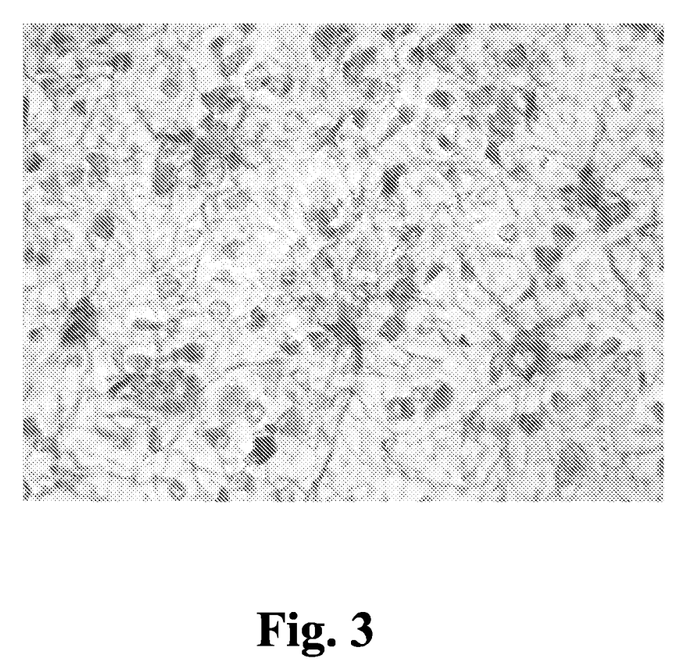
FIG. 3 illustrates an example DPI image according to some embodiments.
Figure 4:
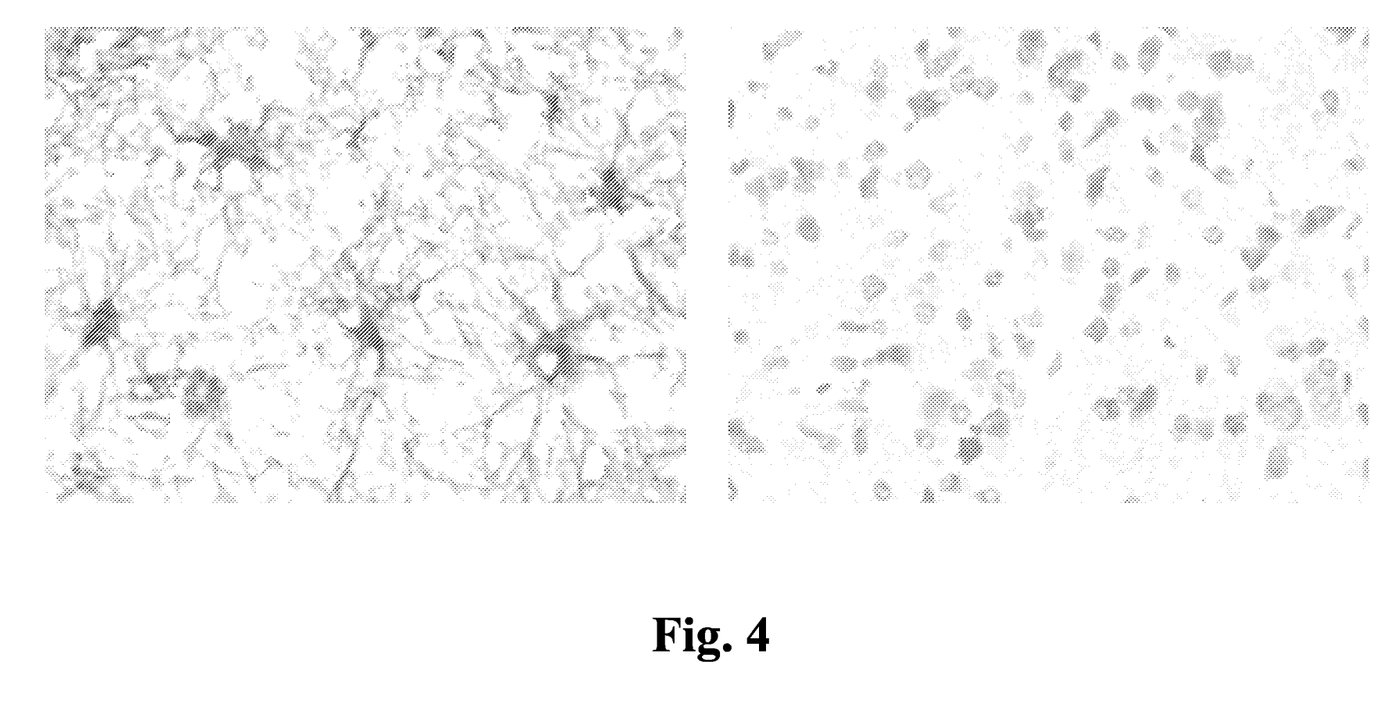
FIG. 4 illustrates stain separation results for the image of FIG. 3 according to some embodiments.

FIG. 4 shows the stain separation results of the image shown in FIG. 3. Each of them is able to be represented by a stain color vector ($V_{c0}$ and $V_{c1}$) and a single-channel image ($C_0$ and $C_1$). The left image is a single-channel image $C_0$, whose color contribution is according to stain vector $V_{c0}$. The left image shows red features with a white background. The right image is a single-channel image $C_1$, whose color contribution is according to stain vector $V_{c1}$. The right image shows blue features with a white background.

Figure 5:
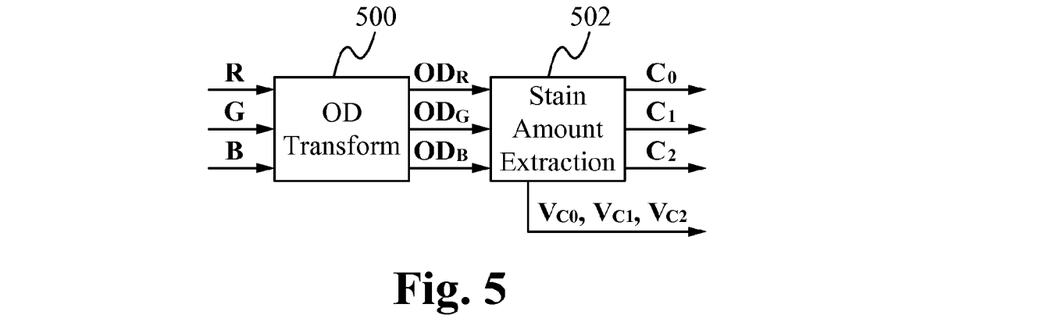
FIG. 5 illustrates a diagram of a stain separation procedure according to some embodiments.

FIG. 5 shows the generic procedure for stain separation. Although three output channels are shown ($C_0$, $C_1$, and $C_2$), in general there may be fewer or there may be more. For example, if only a single stain is present, then $C_0$ is the principal output, while the others are residues that are able to be retained or discarded, depending on the application. Similarly, if two stains are present, then $C_0$ and $C_1$ are the principal outputs, and $C_2$ is a residue that is able to be retained or discarded. In the stain separation procedure, an optical density transform 500 is applied to the color components, resulting in optical density transformed color components. The transformed color components are input to a stain amount extraction 502 which outputs the separated stains on separate channels and stain vectors (e.g. $V_{c0}$, $V_{c1}$, $V_{c2}$). Note that the stain vectors are output as side information. In later figures, "Stain Separation" is used to refer to the procedure shown in FIG. 5.

Figure 6:
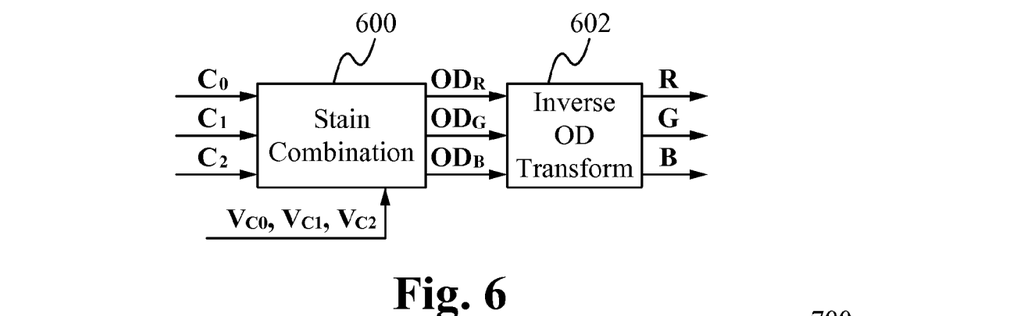
FIG. 6 illustrates a diagram of a stain combination procedure according to some embodiments.

FIG. 6 shows the reverse procedure, which later figures will refer to as "Stain Combination." In the reverse procedure, the separated stains and the stain vectors are input to a stain combination block 600 which generates transformed color components. Then the transformed color components are input into an inverse OD transform block 602 which outputs the color components.

Efficient Data Representation, Compression and Processing

Figure 7:
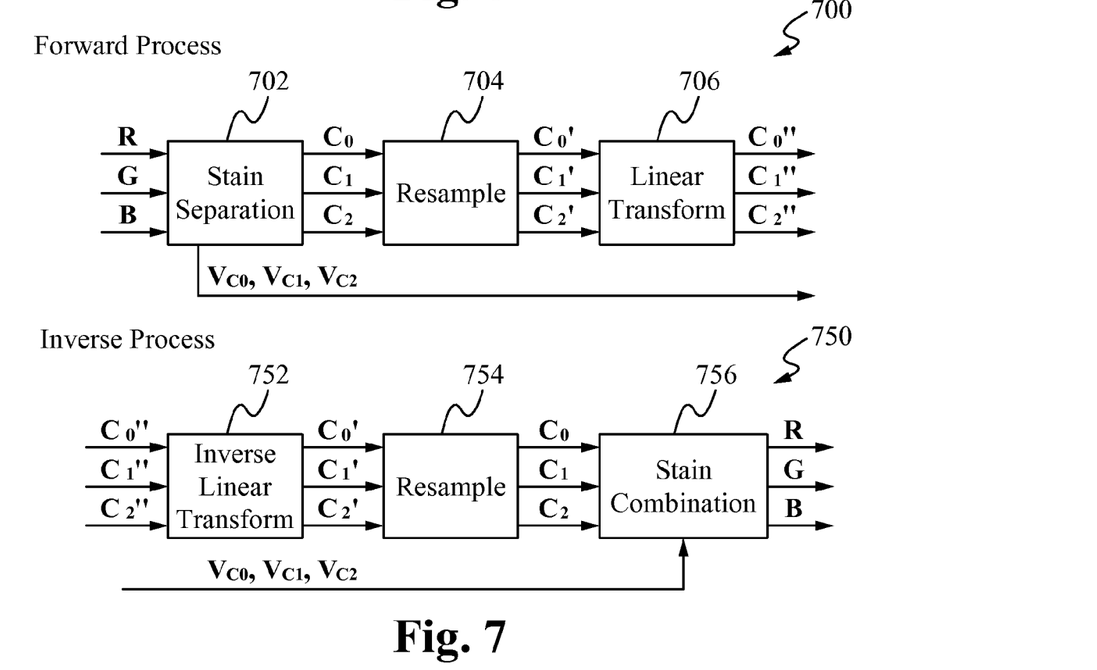
FIG. 7 illustrates a diagram of an efficient data representation by resampling stain color planes according to some embodiments.

FIG. 7 shows one way to use the method for efficient data representation. In the forward process 700, the individual components $C_0 C_1 C_2$, which are the result of stain separation 702, are resampled 704 according to the individual components' importance, similar to the YCbCr approach in FIG. 2. For example, if only two stains are used, then $C_2$ is a residue and is able to be completely eliminated, or alternatively sampled very coarsely. Even if three stains are used, each component is able to be represented at a resolution corresponding to the importance or needs of features present. An optional linear transform 706 is then able to be applied for convenience; one simple example is $C_0''=0.5C_0'+0.5C_1'$ and $C_1''=0.5C_0'-0.5C_1'$, which makes $C_0''$ a new composite color with equal contributions from the two stain components (similar to the Y component of YCbCr, but customized for the particular stains being used), and $C_1''$ a new stain color difference (again, similar to the color differences Cb or Cr from YCbCr, but customized for the particular stains being used).

The inverse process 750 simply reverses the procedure of the forward process 700. An inverse linear transform 752 is applied, the results are resampled 754 and then stain combination 756 is applied.

An alternate configuration not shown in FIG. 7 is to reverse the order of the Resample and Linear Transform blocks.

Another alternate configuration not shown in FIG. 7 is to replace the Resample block (which controls spatial resolution according to components' importance) with an Adjust Precision block, which reduces the number of bits used to represent a sample value.

Figure 8:
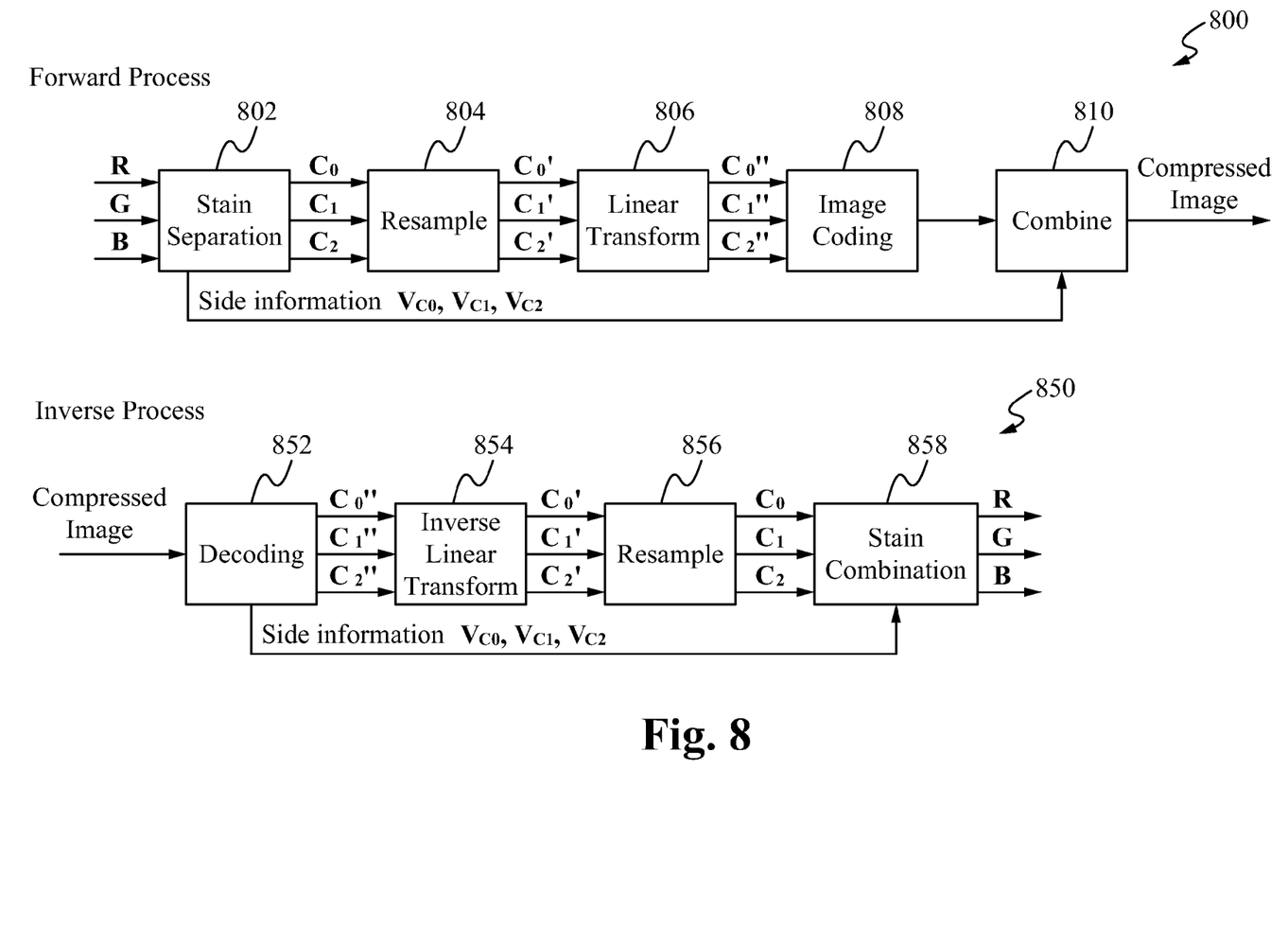
FIG. 8 illustrates a diagram of using image coding with stain separated DPI images according to some embodiments.

FIG. 8 shows another way that the method is able to be used for efficient data representation. Relative to FIG. 7, a new Image Coding block has been added. The Image Coding block is not specified here but is able to include standard methods of image compression, such as compression based on quantization of DCT (discrete cosine transform) or DWT (discrete wavelet transform) coefficients. This configuration allows control of the individual components' fidelity by variation of the quantization levels inherent to the particular coding scheme.

As described, FIG. 8 is similar to FIG. 7 with additional components. In the forward process 800, stain separation 802 occurs followed by resampling 804, then linear transform 806, followed by image coding 808 and then the image coding information and the stain vectors are combined 810 to generate a compressed image.

The inverse process 850 simply reverses the procedure of the forward process 800. A compressed image is decoded 852, then an inverse linear transform 854 is taken, the result is resampled 856 and then stain combination 858 is applied.

An alternate configuration not shown in FIG. 8 above is to reverse the order of the Resample and Linear Transform blocks.

Figure 9:
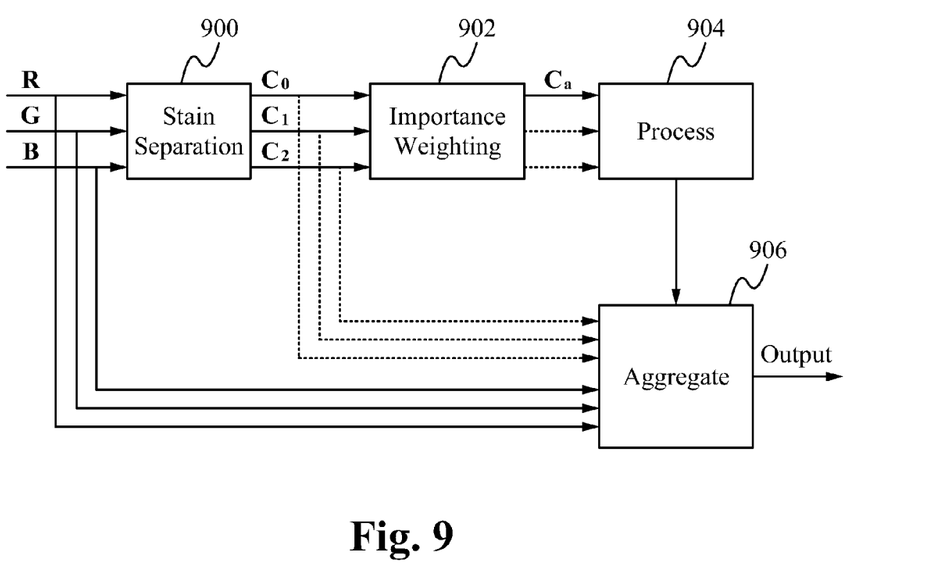
FIG. 9 illustrates a diagram of how to decrease computational complexity by utilizing stain separation results according to some embodiments.

FIG. 9 shows how the method is able to be used to reduce computational complexity for some particular algorithm, represented by the Process block. Stain Separation 900 decomposes the RGB data into its most meaningful components; for example, for a two-stain situation, only $C_0$ and $C_1$ are important, and the residual $C_2$ is non-informative. If the two stains are considered equally important, they are each able to be given weights of 0.5 in the Importance Weighting stage 902, to produce a single color component $C_a=0.5C_0+0.5C_1$; in general, different weights are able to be used. The single component $C_a$ serves as the most informative single color and is able to be processed by the desired algorithm in the Process stage 904. Many different algorithms are able to fit in the Process stage; one example is extended depth of field (EDOF), which generates a single all-focus image from multiple images acquired at different focus depths. The below procedure is more computationally efficient than processing each of R, G, and B, and is more meaningful than only processing the luma (Y) component, whose definition assumes natural imagery. After efficient processing by the Process stage 904, the original RGB data is then able to be re-introduced to produce the final output from the Aggregate stage 906. In the example case of EDOF, the Process stage 904 determines which pixels are most in-focus using only $C_a$, and the Aggregate stage 906 then produces a final all-focus RGB image. Two optional configurations are also mentioned:

(1) additional outputs from the Importance Weighting 902 are possible, for example $C_a$ and $C_b$; and (2) the results of the stain separation $C_0C_1C_2$ are able to be incorporated by the Aggregate stage 906.

Additional algorithms are able to be plugged into the Process stage. Some algorithms, such as edge detection or feature detection, might not require the original RGB data to be re-introduced—the output might be a direct result of the Process stage.

Alternative Methods

There are other standard analysis techniques to find dominant colors, such as Principal Component Analysis (PCA) or the Karhunen-Loève Transform (KLT), among others. However, due to the special nature of DPI images, such standard methods are inappropriate. As described previously, the staining process non-linearly combines several stains. Alternatively, one is able to try to estimate stains based on the dominant colors; however, apparently dominant colors are able to be the joint contribution of several stains. When areas that are stained with multiple stains are selected as one of the dominant colors, considerable information loss may happen.

Figure 10:
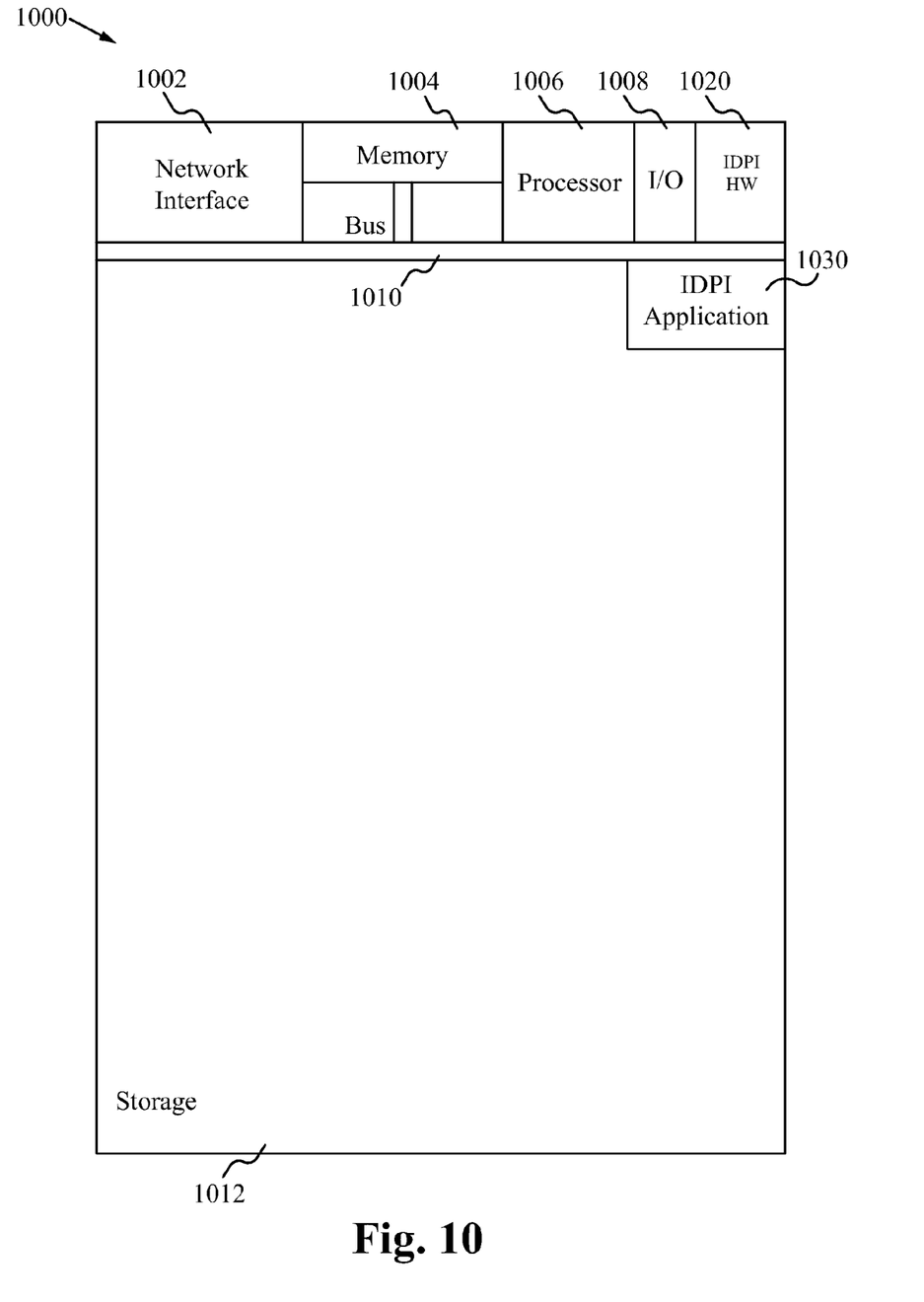
FIG. 10 illustrates a block diagram of an exemplary computing device configured to implement representing and processing color pixel data in digital pathology images according to some embodiments.

FIG. 10 illustrates a block diagram of an exemplary computing device 1000 configured to implement the representing and processing color pixel data in digital pathology images method (also referred to as the improved digital pathology imaging method) according to some embodiments. The computing device 1000 is able to be used to acquire, store, compute, process, communicate and/or display information such as images and videos. For example, a computing device 1000 is able to acquire and store an image. The improved digital pathology imaging method is able to be used during or after acquiring the image, or when displaying the image on the device 1000. In general, a hardware structure suitable for implementing the computing device 1000 includes a network interface 1002, a memory 1004, a processor 1006, I/O device(s) 1008, a bus 1010 and a storage device 1012. The choice of processor is not critical as long as a suitable processor with sufficient speed is chosen. The memory 1004 is able to be any conventional computer memory known in the art. The storage device 1012 is able to include a hard drive, CDROM, CDRW, DVD, DVDRW, flash memory card or any other storage device. The computing device 1000 is able to include one or more network interfaces 1002. An example of a network interface includes a network card connected to an Ethernet or other type of LAN.

The I/O device(s) 1008 are able to include one or more of the following: keyboard, mouse, monitor, display, printer, modem, touchscreen, button interface and other devices. In some embodiments, the hardware structure includes multiple processors and other hardware to perform parallel processing. Improved digital pathology imaging application(s) 1030 used to perform the improved digital pathology imaging method are likely to be stored in the storage device 1012 and memory 1004 and processed as applications are typically processed. More or less components shown in FIG. 10 are able to be included in the computing device 1000. In some embodiments, improved digital pathology imaging hardware 1020 is included. Although the computing device 1000 in FIG. 10 includes applications 1030 and hardware 1020 for implementing the improved digital pathology imaging method, the improved digital pathology imaging method is able to be implemented on a computing device in hardware, firmware, software or any combination thereof. For example, in some embodiments, the improved digital pathology imaging applications 1030 are programmed in a memory and executed using a processor. In another example, in some embodiments, the improved digital pathology imaging hardware 1020 is programmed hardware logic including gates specifically designed to implement the encoding method.

In some embodiments, the improved digital pathology imaging application(s) 1030 include several applications and/or modules. Modules in some processes include a stain separation module for separating stain color components, a resampling module for resampling the color components, a transform component for applying a linear transform, a coding module for applying a coding algorithm and a combination module for combining side information and the coded image. In some processes, modules include an importance weighting module for determining a weighting for each color component, a process module for applying an algorithm and an aggregate module for generating an output using the processed information and the original information. Modules in some processes include a decoding module for decoding an image, an inverse transform module for applying an inverse linear transform, a resampling module for resampling the color components and a stain combination module for combining stain color components. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system, a scanner such as a DPI scanner, or any other suitable computing device.

Figure 11:
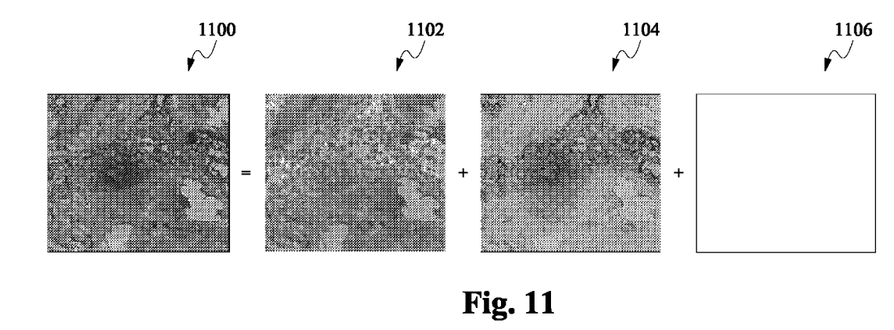
FIG. 11 illustrates an example of stain combination according to some embodiments.

FIG. 11 illustrates an example of stain combination according to some embodiments. An original RGB image 1100 is the combination of image 1102, image 1104 and image 1106. The image 1102 is the output of FIG. 6 using only the first stain, $C_0$. The image 1104 is the output of FIG. 6 using only the second stain, $C_1$. The image 1106 is the output of FIG. 6 using only the residual, $C_2$, since the original image only includes two stains.

Figure 12:
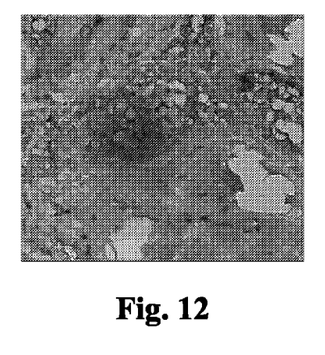
FIG. 12 illustrates an exemplary original image include three color planes according to some embodiments.

FIG. 12 illustrates an exemplary original image include three color planes according to some embodiments. In this example, the three planes are RGB although any color scheme is able to be used.

Figure 13:
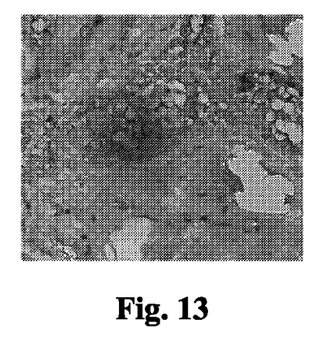
FIG. 13 illustrates an exemplary modified image with two color planes according to some embodiments.

FIG. 13 illustrates an exemplary modified image with two color planes according to some embodiments. The modified image only includes the two color planes ($C_0$ and $C_1$), where the residual color plane has been eliminated.

To utilize the improved digital pathology imaging method, a user acquires a video/image such as on a digital camera, and while or after the image is acquired, or when displaying the image, the improved digital pathology imaging method is automatically used for encoding the image, so that the image is encoded efficiently while maintaining quality. The improved digital pathology imaging method occurs automatically without user involvement. In instances where the user desires to make manual modifications, a user is able to specify properties of the stains as part of the stain-separation process as well as provide other desired information. The image is also able to be decoded to be displayed using a similar method.

In operation, the improved digital pathology imaging method is able to include more-efficient image compression and more efficient processing of the data. Efficient image compression is accomplished by assigning fewer bits to less-important colors. Efficient data processing is accomplished by processing only those colors, or combinations of colors, that are deemed important.

SOME EMBODIMENTS OF METHOD FOR EFFICIENT REPRESENTATION AND PROCESSING OF COLOR PIXEL DATA IN DIGITAL PATHOLOGY IMAGES

1. A method of representing a digital pathology image programmed in a controller in a device comprising:
   a. implementing stain separation to separate a stain including at least one color component; and
   b. resampling the at least one color component based on importance.
2. The method of clause 1 further comprising applying a linear transform to the at least one resampled color component.
3. The method of clause 1 further comprising image coding and combining the coded image and stain vector information to generate a compressed image.
4. The method of clause 3 wherein image coding comprises compression based on quantization of discrete cosine transform or discrete wavelet transform coefficients.
5. The method of clause 1 wherein stain separation separates the stain including at least two color components.
6. The method of clause 1 wherein resampling comprises reducing a number of bits used to represent a sample value.
7. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system and a scanner.
8. A method of encoding a digital pathology image programmed in a controller in a device comprising:
   a. implementing stain separation to separate a stain including at least two color components;
   b. resampling the at least two color components based on importance;
   c. applying a linear transform to the at least two resampled color components resulting in transformed data;
   d. encoding the transformed data into encoded data; and
   e. combining the encoded data and stain vector information to generate a compressed image.
9. The method of clause 8 wherein image coding comprises compression based on quantization of discrete cosine transform or discrete wavelet transform coefficients.
10. The method of clause 8 wherein resampling comprises reducing a number of bits used to represent a sample value.
11. The method of clause 8 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system and a scanner.
12. A method of decreasing computational complexity of processing a digital pathology image by using stain separation programmed in a controller in a device comprising:
   a. implementing stain separation to separate a stain into color components;
   b. implementing importance weighting for determining a weighting for each of the color components to produce a single color component;
   c. processing the single color component; and
   d. aggregating an output using the processed single color component and additional information.
13. The method of clause 12 wherein processing comprises implementing extended depth of field.
14. The method of clause 12 wherein the additional information comprises original RGB information.
15. The method of clause 12 wherein the additional information comprises the color components.
16. An apparatus for encoding a digital pathology image programmed in a controller in a device comprising:
    a. a stain separation module for separating stain components;
    b. a resampling module for resampling the stain components based on importance;
    c. a transform module for applying a linear transform to the resampled stain components resulting in transformed data;
    d. an encoding module for encoding the transformed data; and
    e. a combining module for combining the encoded image and stain vector information to generate a compressed image.
17. The apparatus of clause 16 wherein image coding comprises compression based on quantization of discrete cosine transform or discrete wavelet transform coefficients.
18. The apparatus of clause 16 wherein resampling comprises reducing a number of bits used to represent a sample value.
19. The apparatus of clause 16 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system and a scanner.
20. An apparatus comprising:
    a. a memory for storing an application, the application for:
       i. implementing stain separation to separate a stain including at least one color component; and
       ii. resampling the at least one color component based on importance; and
    b. a processing component coupled to the memory, the processing component configured for processing the application.
21. The apparatus of clause 20 wherein the application is further for applying a linear transform to the at least one resampled color component.
22. The apparatus of clause 20 wherein the application is further for image coding and combining the coded image and stain vector information to generate a compressed image.
23. The apparatus of clause 22 wherein image coding comprises compression based on quantization of discrete cosine transform or discrete wavelet transform coefficients.
24. The apparatus of clause 20 wherein stain separation separates the stain including at least two color components.
25. The apparatus of clause 20 wherein resampling comprises reducing a number of bits used to represent a sample value.
26. The apparatus of clause 20 wherein the apparatus comprises a camera.

27. A method of generating a digital pathology image programmed in a controller in a device comprising:
   a. decoding an image resulting in transformed color components;
   b. applying an inverse linear transform to the transformed color components resulting in resampled color components;
   c. resampling the resampled color components resulting in stain color components; and
   d. combining the stain color components and additional information to generate the digital pathology image.
28. The method of clause 27 wherein the additional information comprises stain vector information.
29. The method of clause 27 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system and a scanner.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of representing a digital pathology image programmed in a controller in a device comprising:
   a. implementing, with the device, stain separation to separate a stain including at least one color component;
   b. resampling the at least one color component based on importance;
   c. encoding the resampled color component into an encoded color component; and
   d. combining the encoded color component and stain vector information to generate a compressed image.
2. The method of claim 1 further comprising applying a linear transform to the at least one resampled color component.
3. The method of claim 1 wherein image coding comprises compression based on quantization of discrete cosine transform or discrete wavelet transform coefficients.
4. The method of claim 1 wherein stain separation separates the stain including at least two color components.
5. The method of claim 1 wherein resampling comprises reducing a number of bits used to represent a sample value.
6. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system and a scanner.
7. A method of encoding a digital pathology image programmed in a controller in a device comprising:
   a. implementing, with the device, stain separation to separate a stain including at least two color components;
   b. resampling the at least two color components based on importance;
   c. applying a linear transform to the at least two resampled color components resulting in transformed data;
   d. encoding the transformed data into encoded data; and
   e. combining the encoded data and stain vector information to generate a compressed image.
8. The method of claim 7 wherein image coding comprises compression based on quantization of discrete cosine transform or discrete wavelet transform coefficients.
9. The method of claim 7 wherein resampling comprises reducing a number of bits used to represent a sample value.
10. The method of claim 7 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system and a scanner.
11. A method of decreasing computational complexity of processing a digital pathology image by using stain separation programmed in a controller in a device comprising:
   a. implementing, with the device, stain separation to separate a stain into color components;
   b. implementing importance weighting for determining a weighting for each of the color components to produce a single color component;
   c. processing the single color component; and
   d. aggregating an output using the processed single color component and additional information.
12. The method of claim 11 wherein processing comprises implementing extended depth of field.
13. The method of claim 11 wherein the additional information comprises original RGB information.
14. The method of claim 11 wherein the additional information comprises the color components.
15. An apparatus for encoding a digital pathology image programmed in a controller in the apparatus comprising:
   a. a stain separation module for separating stain components;
   b. a resampling module for resampling the stain components based on importance;
   c. a transform module for applying a linear transform to the resampled stain components resulting in transformed data;
   d. an encoding module for encoding the transformed data; and
   e. a combining module for combining the encoded image and stain vector information to generate a compressed image.
16. The apparatus of claim 15 wherein image coding comprises compression based on quantization of discrete cosine transform or discrete wavelet transform coefficients.
17. The apparatus of claim 15 wherein resampling comprises reducing a number of bits used to represent a sample value.
18. The apparatus of claim 15 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system and a scanner.

19. An apparatus comprising:
a. a memory for storing an application, the application for:
   i. implementing stain separation to separate a stain including at least one color component;
   ii. resampling the at least one color component based on importance;
   iii. encoding the resampled color component into an encoded color component; and
   iv. combining the encoded color component and stain vector information to generate a compressed image; and
b. a processing component coupled to the memory, the processing component configured for processing the application.

20. The apparatus of claim 19 wherein the application is further for applying a linear transform to the at least one resampled color component.

21. The apparatus of claim 19 wherein image coding comprises compression based on quantization of discrete cosine transform or discrete wavelet transform coefficients.

22. The apparatus of claim 19 wherein stain separation separates the stain including at least two color components.

23. The apparatus of claim 19 wherein resampling comprises reducing a number of bits used to represent a sample value.

24. The apparatus of claim 19 wherein the apparatus comprises a camera.

25. A method of generating a digital pathology image programmed in a controller in a device comprising:
a. decoding, with the device, an image resulting in transformed color components;
b. applying an inverse linear transform to the transformed color components resulting in resampled color components;
c. resampling the resampled color components resulting in stain color components; and
d. combining the stain color components and additional information to generate the digital pathology image.

26. The method of claim 25 wherein the additional information comprises stain vector information.

27. The method of claim 25 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system and a scanner.

* * * * *